(12) United States Patent
Taylor et al.

(10) Patent No.: US 8,249,119 B2
(45) Date of Patent: Aug. 21, 2012

(54) METHOD AND APPARATUS FOR GENERATING OPTICAL BEATS

(75) Inventors: David Maurice Taylor, Malvern (GB);
David Mark Benton, Malvern (GB);
Charlotte R H Bennett, Malvern (GB);
Laurent Michaille, Malvern (GB);
Terence John Shepherd, Malvern (GB)

(73) Assignee: Qinetiq Limited, London (GB)

( * ) Notice: Subject to any disclaimer, the term of this patent is extended or adjusted under 35 U.S.C. 154(b) by 17 days.

(21) Appl. No.: 12/865,486

(22) PCT Filed: Feb. 2, 2009

(86) PCT No.: PCT/GB2009/000288
§ 371 (c)(1),
(2), (4) Date: Aug. 2, 2010

(87) PCT Pub. No.: WO2009/095698
PCT Pub. Date: Aug. 6, 2009

(65) Prior Publication Data
US 2010/0329289 A1 Dec. 30, 2010

(30) Foreign Application Priority Data
Feb. 1, 2008 (GB) .................................... 0801862.4

(51) Int. Cl.
*H01S 3/30* (2006.01)
(52) U.S. Cl. .......................................................... 372/6
(58) Field of Classification Search ........................ 372/6
See application file for complete search history.

(56) References Cited

U.S. PATENT DOCUMENTS

| 4,120,587 A | * | 10/1978 | Vali et al. | ....................... 356/461 |
| 5,566,196 A | | 10/1996 | Scifres | |
| 7,054,339 B1 | * | 5/2006 | Hu et al. | ......................... 372/12 |

FOREIGN PATENT DOCUMENTS

| EP | 1 158 351 A1 | | 11/2001 |
| JP | 2005109036 A | * | 4/2005 |
| JP | A-2005-109036 | | 4/2005 |

OTHER PUBLICATIONS

Masahiko, T. et al., "Generation of Coherent Terahertz Radiation by Photomixing of Dual-Mode Lasers," *Optical and Quantum Electronics*, 2000, pp. 503-520, vol. 32.
Hoffmann, S. et al., "Two-Colour Diode Lasers for Generation of THz Radiation," *Semiconductor Science and Technology*, 2005, pp. 1-11, vol. 20, No. 7.
Tani, M. et al., "Generation of Terahertz Radiation by Photomixing with Dual- and Multiple-Mode Lasers," *Semiconductor Science and Technology*, 2005, pp. 1-24, vol. 20, No. 7.
Gu, P. et al., "Generation of cw-Terahertz Radiation Using a Two-Longitudinal-Mode Laser Diode," *Japanese Journal of Applied Physics*, 1998, pp. L976-L978, vol. 37, part 2, No. 8B.

(Continued)

*Primary Examiner* — Patrick Stafford
(74) *Attorney, Agent, or Firm* — Oliff & Berridge, PLC

(57) ABSTRACT

Apparatus comprising an optical fiber laser having at least two laser cores and means arranged to combine laser output from the at least two laser cores at a first end of the optical fiber laser to produce a combined laser output having one or more beat signals.

15 Claims, 4 Drawing Sheets

OTHER PUBLICATIONS

Dragoman, D. et al., "Terahertz Fields and Applications," *Progress in Quantum Electronics*, 2004, pp. 1-66, vol. 28.

Lisauskas, A. et al., "Photonic Terahertz Technology," *Semiconductor Science and Technology*, 2005, pp. 1-6, vol. 20, No. 7.

Nahata, A. et al., "Two-Dimensional Imaging of Continuous-Wave Terahertz Radiation Using Electro-Optic Detection," *Applied Physics Letters*, 2002, pp. 963-965, vol. 81, No. 6.

Siebert, K. et al., "Continuous-Wave All-Optoelectronic Terahertz Imaging," *Applied Physics Letters*, 2002, pp. 3003-3005, vol. 80, No. 16.

Breede, M. et al., "Fourier-Transform External Cavity Lasers," *Optics Communications*, 2002, pp. 261-271, vol. 207.

Gu, P. et al., "Generation of Sub-THz Radiation Using a Two-Longitudinal-Mode Laser Diode," *Japanese Journal of Applied Physics*, 1998, pp. 261-262, vol. 37.

Hyodo, M. et al., "Generation of Millimeter-Wave Signals up to 70.5 GHz by Heterodyning of Two Extended-Cavity Semiconductor Lasers with an Intracavity Electro-Optic Crystal," *Optics Communications*, 1999, pp. 159-169, vol. 171.

Boullet, J. et al., "Coherent Combining in an Yb Doped Double Core Fiber Laser," *Conference on Lasers & Electro-Optics*, 2005, pp. 523-525.

Mears, R. et al., "Low-Threshold Tunable CW and Q-Switched Fibre Operating at 1.55MUM," *Electronics Letters*, 1986, pp. 159-160, vol. 22, No. 3.

Kaur, K. et al., "Generation of Phase Shifted Microwaves using Thermo-Optic Multimode Interference Phase Modulator Antenna Array Based on ORMOCERs," *Australian Conference on Optical Fibre Technology*, 2007, pp. 1-3.

Wyatt, R. et al., "High-Power Broadly Tunable Erbium-Doped Silica Fibre Laser," *Electronics Letters*, 1989, pp. 1498-1499, vol. 25, No. 22.

Michaille L. et al., "Characteristics of a Q-Switched Multicore Photonic Crystal Fiber Laser with a Very Large Mode Field Area," *Optics Letters*, 2008, pp. 71-73, vol. 33, No. 1.

Gu, P. et al., "Generation of Coherent cw-Terahertz Radiation Using a Tunable Dual-Wavelength External Cavity Laser Diode," *Japanese Journal of Applied Physics*, 1999, pp. L1246-L1247, vol. 38, No. 11A.

International Search Report issued in Patent Application No. PCT/GB2009/000288, dated May 25, 2009.

Written Opinion issued in Patent Application No. PCT/GB2009/000288, dated May 25, 2009.

* cited by examiner

METHOD AND APPARATUS FOR GENERATING OPTICAL BEATS

The present invention relates to methods and apparatus for generating beats with optical radiation.

The production of an optical beat signal is a key step in the generation of cw THz radiation by photomixing. In one implementation this technique respective outputs of two stable, narrow linewidth lasers emitting at wavelengths having a frequency separation in the THz range are combined to produce beats and subsequently THz electromagnetic radiation by use of a nonlinear optical crystal or a photoconductive antenna. In principle, any two laser systems with sufficient stability can be used, although cost-effective, robust and highly stable cw THz sources often comprise two semiconductor lasers, for example two DBR lasers (e.g. A. Nahata et al, *Appl. Phys. Lett.* 81 (2002) p 963). THz sources comprising two separate lasers tend to be rather complex because the lasers must be arranged to be stable with respect to each other. A simpler approach to mutual stability involves use of a single laser arranged to emit two wavelengths simultaneously. This approach has been demonstrated using a single Ti: sapphire laser (e.g. K. J. Siebert et al, *Appl. Phys. Lett.* 80 (2002), p 3003), using a diode laser operating simultaneously on two or more longitudinal modes (e.g. M. Breede et al, *Opt. Comm.* 207 (2002) p 261 and G. Ping et al, *Jpn. J. Appl. Phys.* 37 (1998) p L976) and also using a 'microchip' laser (e.g. M. Hyodo et al, *Electron. Lett.* 32 (1996) p 1589).

CW THz sources have potential applications in fields such as spectroscopy, imaging, security applications and communications, however the low power output of prior art systems is a limiting factor in the practical use of such sources.

A first aspect of the invention provides apparatus comprising an optical fibre laser having at least two laser cores and means arranged to combine laser output from the at least two laser cores at a first end of the optical fibre laser to produce a combined laser output having one or more beat signals.

Apparatus of the invention simultaneously provides the advantages of efficient, compact and robust operation together with high power output and low-phase noise in each of the one or more optical beat signals due to high mutual stability of the laser cores. These advantages mean that apparatus of the invention is highly to suited to practical applications outside the laboratory.

The laser cores may have the same or different laser species. In the latter case the apparatus preferably further comprises feedback means arranged to cause respective laser cores to lase at different frequencies to ensure beat signals are generated.

Conveniently, the feedback means may comprise a reflection grating arranged to reflect laser output from the laser cores at a second end of the optical fibre laser back into the laser cores at the second end of the optical fibre, laser output from a given laser core being reflected back into the same laser core at frequency unique to that laser core. A lens may be used to direct laser output of a given laser core at the second end of the optical fibre laser onto the reflection grating at an angle unique to that laser core.

Preferably the reflection grating is adjustable to allow frequency-tuning of the one or more beat signals.

To produce higher peak power in the combined laser output, one or more of the laser cores of the optical fibre laser may be Q-switched.

Electromagnetic radiation at the frequency or frequencies of the one or more beat signals may be generated by applying the combined laser output to a nonlinear device such as a photoconductive antenna or a nonlinear crystal.

Since optical fibre lasers can produce very high laser output powers (for example hundreds of watts cw) a single photoconductive antenna may suffer damage from the combined laser output. Such damage may be avoided by dividing the combined laser output into a series of portions and applying each portion to a respective photoconductive antenna in an array of such antennas. Division may be achieved using a multimode interference (MMI) splitting device; MMI splitting devices having hollow waveguides are well-suited to handling high power radiation. By using a suitable MMI splitting device, a two-dimensional array of portions may be produced, each of which may then be applied to a photoconductive antenna in a two-dimensional array of such antennas. Whether the array is one- or two-dimensional, steering of the electromagnetic radiation emitted from the array may be achieved by applying suitable phase-shifts to respective portions prior to their input to respective antennas.

The optical fibre laser is preferably a photonic crystal fibre laser because photonic crystal fibres can be routinely made with two or more guiding cores having well-defined positions. Where the laser species of the laser cores are the same and the feedback means comprise a reflection grating and a lens for directing laser outputs from respective laser cores onto the reflection so that they output impinge on the grating at different angles, the general magnitude of the beat frequency or frequencies can be increased by arranging for the laser cores to be spaced further apart. The allows the difference in diffracted order for each laser core to be increased.

Apparatus of the invention in which the combined laser output is applied to a nonlinear device may be used to generate tunable THz radiation. If the laser cores have different laser species, very high frequency THz radiation may be generated. For example, if two laser cores are provided having species allowing lasing at 1 μm and 1.5 μm respectively, a beat frequency of 100 THz is achievable, which corresponds to a generated wavelength of 3 μm. The apparatus can therefore be employed as a substitute for masers and long-wavelength lasers.

A second aspect of the invention provides a method of generating one or more optical beat signals and a method of generating electromagnetic radiation at the frequency or frequencies of the one or more beat signals.

Embodiments of the invention are described below with reference to the accompanying drawings in which.

Figure 1:
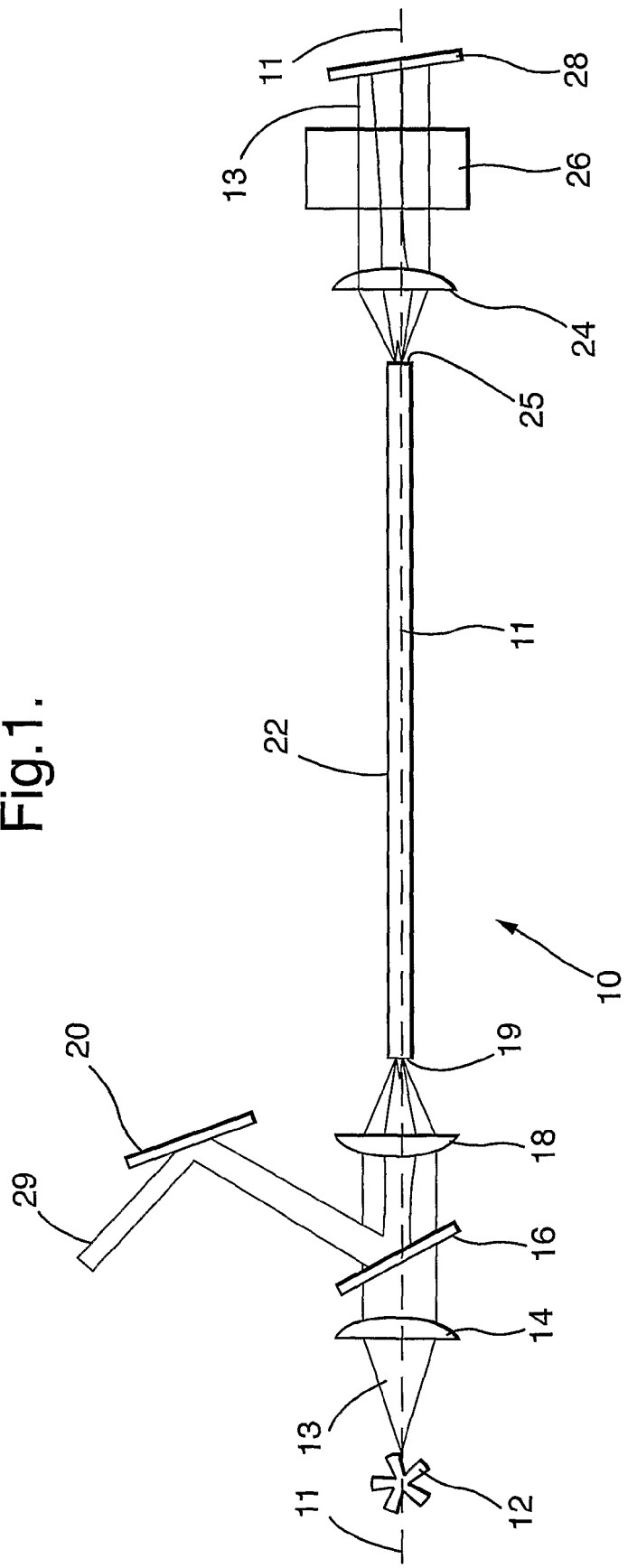
FIG. 1 shows an example apparatus of the invention.
Figure 2:
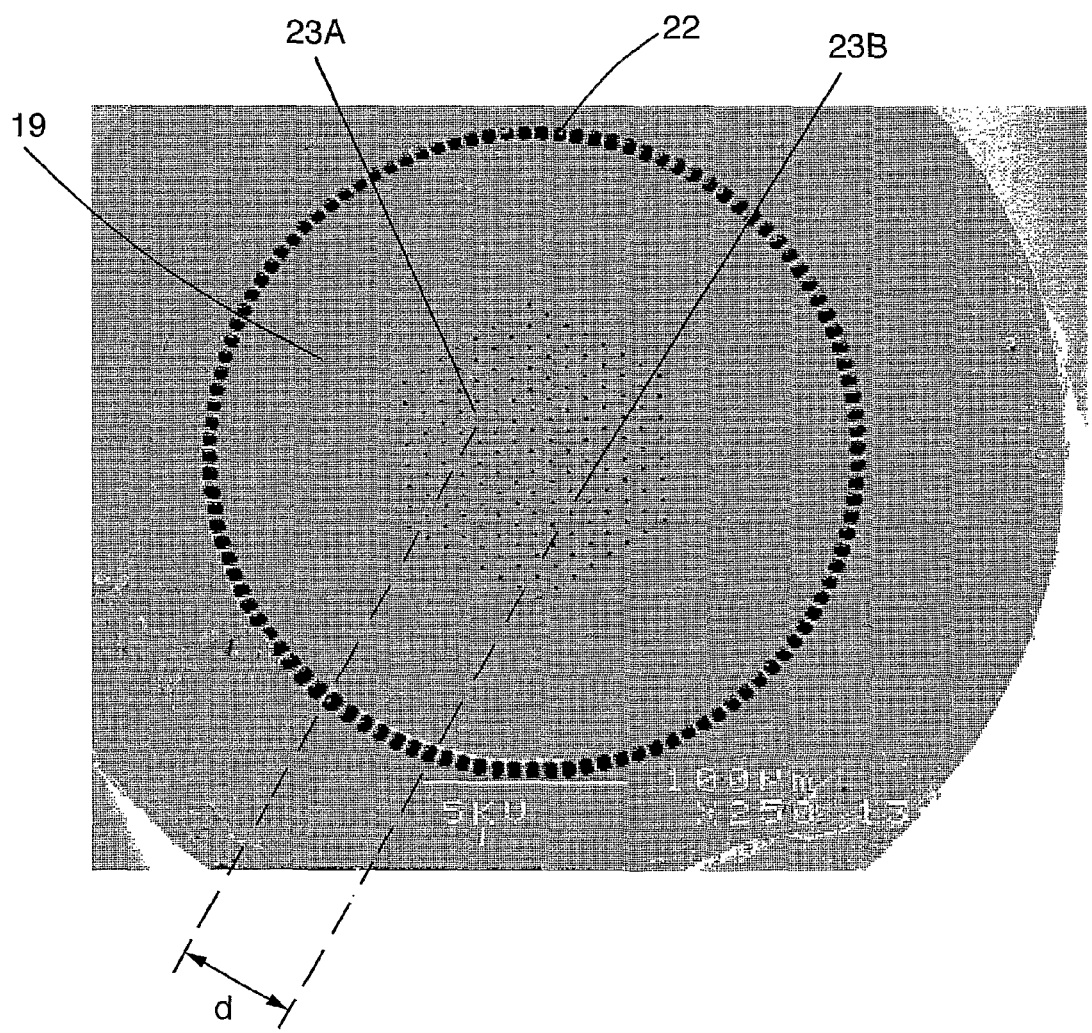
FIG. 2 shows an end view of a PCF laser amplifier comprised in the FIG. 1 apparatus.
Figure 3:
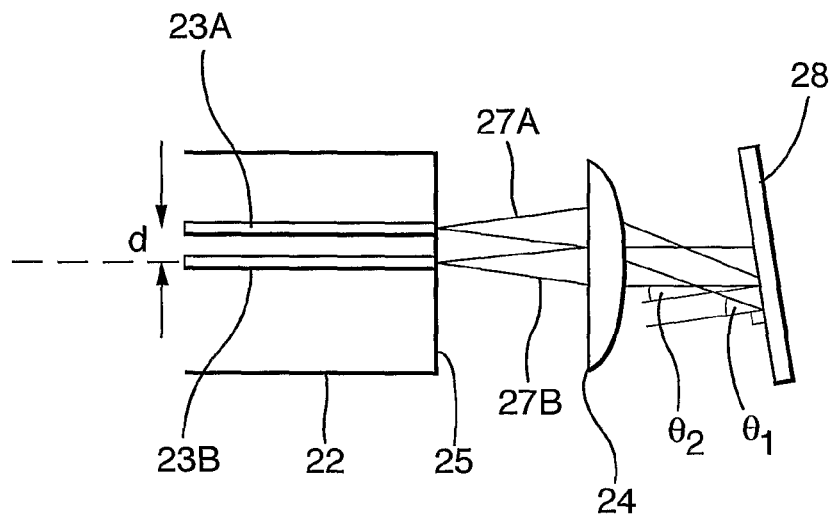
FIG. 3 shows in detail a feedback arrangement of the FIG. 1 apparatus.

Referring to FIGS. 1, 2 and 3, an example apparatus 10 of the invention comprises a photonic crystal fibre (PCF) laser 22 having two laser cores 23A, 23B doped with ytterbium ions and spaced $\Lambda=150$ μm apart, a pump source 12 (comprising GaAs diodes emitting at 915 nm or 980 nm) and associated coupling lenses 14, 18, a dichroic output minor 16, a feedback arrangement comprising a lens 24 of focal length f=50 mm and a reflecting diffraction grating 28 having grating pitch d=10 μm, and a Q-switch 26 (e.g. a Pockels cell with associated polarisers, or an acouto-optic modulator) arranged along an axis 11. The apparatus 10 further comprises an output diffraction grating 20.

Pump radiation 13 from the pump source 12 is input to the laser cores 23A, 23B at a first end 19 of the PCF 22 via coupling lenses 14, 18 and a dichroic mirror 16. Laser output 27A, 27B from laser cores 23A, 23B respectively at a second end 25 of the PCF is collimated by a lens 24 and impinges on the reflection grating 28 such that laser outputs 27A, 27B impinge on the grating 28 at angles $\theta_1$, $\theta_2$ respectively to the grating normal; the frequency of reflected radiation therefore differs for the two laser cores 23A, 23B. The first end 19 of the PCF amplifier 10, and the grating 28 define ends of a laser resonator. Laser output 27A, 27B at the first end 19 of the PCF laser 10 is collimated by the lens 18 and reflected from the dichroic output mirror 16 and output diffraction grating 20 to produce combined laser output in which laser outputs from the laser cores 23A, 23B overlap to produce a beating signal in a common spatial mode.

The wavelengths $\lambda_1$, $\lambda_2$ fed back from the reflection grating 28 to the laser cores 23A, 23B are given by $\lambda_1 = 2d \sin(\theta_1 + \Lambda/f)$ and $\lambda_2 = 2d \sin \theta_2$ respectively, where $\Lambda$ is the separation of the laser cores 23A, 23B. Hence the wavelengths $\lambda_1$, $\lambda_2$ are also the respective lasing wavelengths of the laser cores 23A, 23B. The difference in the respective lasing wavelengths $\lambda_1$, $\lambda_2$ of the two laser cores 23A, 23B (and hence the beat frequency of the combined laser output 29) may therefore be controlled by appropriate selections for the reflection grating 28 (via d), lens 24 (via f), and laser core separation $\Lambda$. (A PCF laser may be fabricated with any one of a large number of different laser cores separations $\Lambda$).

Figure 4:
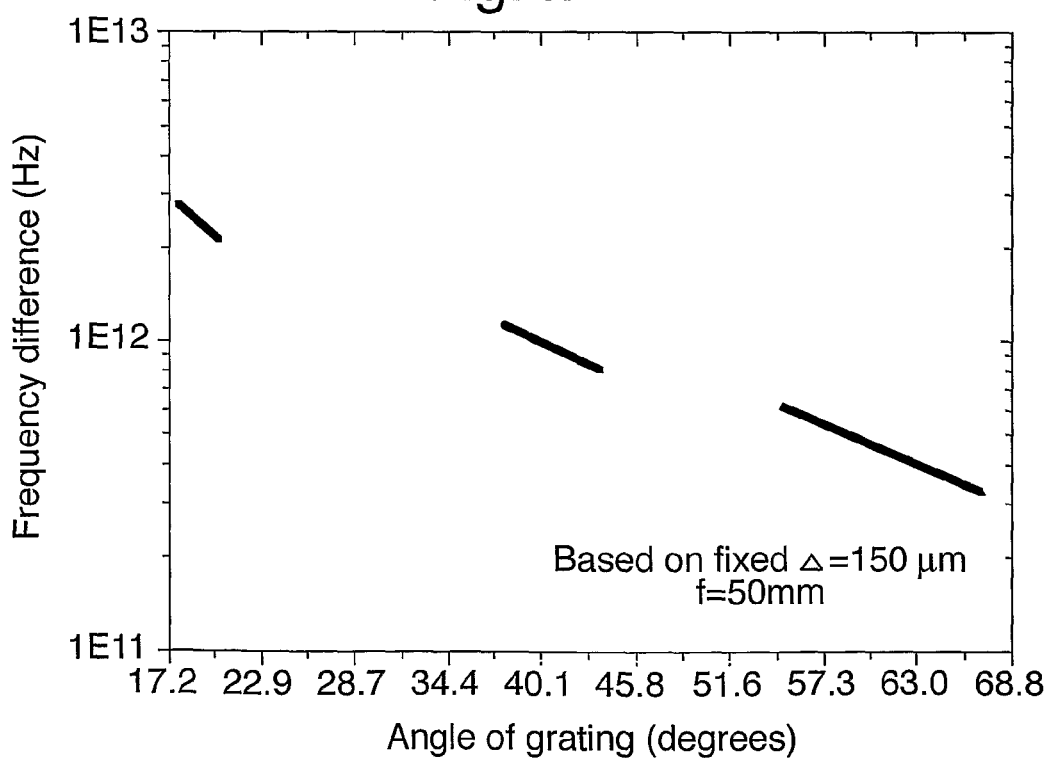
FIG. 4 illustrates the tuning range of the FIG. 1 apparatus.

The beat frequency of the combined laser output 29 may be tuned by adjusting the inclination of reflection grating 28 to the axis 11, thus varying the angles $\theta_1$, $\theta_2$. FIG. 4 illustrates tuning of the beat frequency in the range 400 GHz-4 THz by adjusting the inclination of the reflection grating 28 to the axis 11 between 17 and 69 degrees, and by using different values of d.

Figure 5:
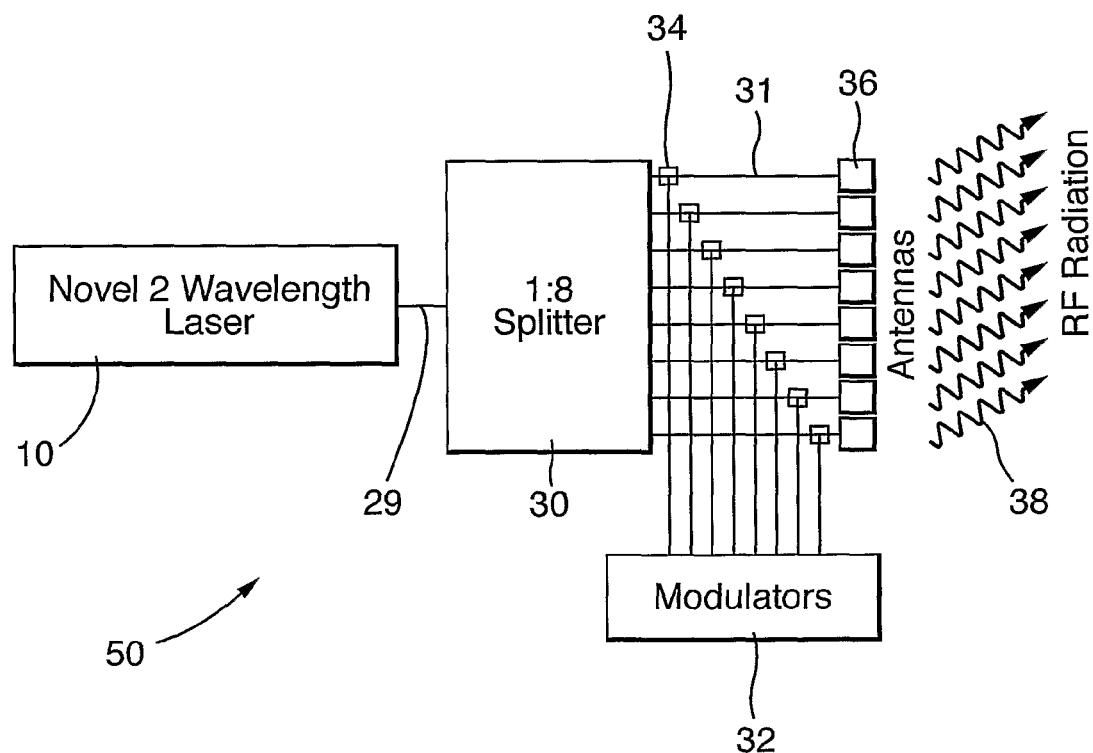
FIG. 5 shows apparatus of the invention for generating THz radiation.

In FIG. 5, an apparatus 50 of the invention for generating tunable, steerable THz radiation comprises the apparatus 10 of FIG. 1, a 1-to-8 way hollow-core multimode interference (MMI) splitter 30 having eight outputs, such as 31, each of which is coupled to a photoconductive antenna, such as 36. The outputs of the splitter 30 are each controlled by a modulator 32.

The combined laser output 29 of the apparatus 10 is divided into eight portions by the hollow-core MMI splitter 30. A phase-shift is applied to each portion by a modulator 32 prior to its application to a photoconductive antenna. The apparatus 50 is therefore able to produce steerable THz radiation, or more generally steerable radiation at the frequency of the beat signal of the combined laser output 29.

The invention claimed is:

1. An apparatus comprising:
   an optical fibre laser having at least two laser cores;
   means arranged to combine laser output from the at least two laser cores at a first end of the optical fibre laser to produce a combined laser output having one or more beat signals; and
   feedback means arranged to cause the laser cores to lase at different frequencies, the feedback means including a lens and a reflection grating,
   wherein the lens is arranged to direct laser output of a given laser core at the second end of the optical fibre laser onto the reflection grating at an angle unique to that laser core, and
   the reflection grating is arranged to reflect laser output from the laser cores at a second end of the optical fibre laser back into the laser cores at the second end of the optical fibre, such that laser output from a given laser core is reflected back into the same laser core at a frequency unique to that laser core.

2. The apparatus according to claim 1 wherein the reflection grating is adjustable to allow frequency-tuning of the one or more beat signals.

3. The apparatus according to claim 1 wherein the one or more laser cores have respective laser species.

4. The apparatus according to claim 1 further comprising means for Q-switching at least one laser core of the optical fibre laser.

5. The apparatus according to claim 1, the apparatus further comprising a nonlinear device arranged to receive the combined laser output and emit in response thereto electromagnetic radiation at the frequency or frequencies of the one or more beat signals.

6. The apparatus according to claim 5 wherein the nonlinear device comprises an array of photoconductive antennas and the apparatus further comprises dividing means arranged to divide the combined laser output into portions and apply each portion to a respective photoconductive antenna.

7. The apparatus according to claim 6 wherein the dividing means is arranged to produce a two-dimensional array of portions and the array of photoconductive antennas is a two-dimensional array.

8. The apparatus according to claim 6 further comprising means for phase-shifting one or more of said portions prior to the application of each portion to a respective photoconductive antenna to effect steering of the electromagnetic radiation emitted by the array.

9. The apparatus according to claim 1 wherein the optical fibre laser is a photonic crystal fibre laser.

10. An apparatus for generating THz radiation, the apparatus comprising the apparatus of claim 1.

11. A method of generating one or more optical beat signals, the method comprising the steps of:
   (i) providing an optical fibre laser having at least two laser cores;
   (ii) providing feedback means to cause respective laser cores to lase at different frequencies, the feedback means comprising a lens and a reflection grating;
   (iii) using the lens to direct laser output of a given laser core at the second end of the optical fibre laser onto the reflection grating at an angle unique to that laser core;
   (iv) using a reflection grating to reflect laser output from the laser cores at a second end of the optical fibre laser back into the laser cores at the second end of the optical fibre laser such that laser output from a given laser core is reflected back into the same laser core at a frequency unique to that laser core; and
   (v) combining laser output from the at least two laser cores at a first end of the optical fibre laser to produce a combined laser output having one or more beat signals.

12. The method according to claim 11 further comprising the step of Q-switching at least one laser core of the optical fibre laser.

13. The method according to claim 11 further comprising the step of applying the combined laser output to a nonlinear device to generate electromagnetic radiation at the frequency or frequencies of the one or more beat signals.

14. The method according to claim 13 wherein the nonlinear device is an array of photoconductive antennas and wherein the method comprises the steps of dividing the combined laser output into portions and applying each portion to a respective photoconductive antenna.

15. The method according to claim 14 further comprising the step of phase-shifting one or more of said portions prior to application thereof to respective photoconductive antennas to effect steering of the electromagnetic radiation.

* * * * *